Nov. 13, 1956      E. G. DAVIS      2,770,586

GRID BEARING AND METHOD OF MAKING SAME

Filed Jan. 8, 1953

INVENTOR
Edgar G. Davis
BY
Willits, Helwig & Baillio
ATTORNEYS

United States Patent Office 2,770,586
Patented Nov. 13, 1956

2,770,586

GRID BEARING AND METHOD OF MAKING SAME

Edgar G. Davis, Brownsburg, Ind., assignor to General Motors Corporation, Detroit, Mich., a corporation of Delaware Application January 8, 1953, Serial No. 330,256

9 Claims. (Cl. 204—37)

This invention relates to improvements in grid bearings.

Grid bearings are characterized by bearing surfaces consisting of a multiplicity of small areas of hard and soft bearing materials arranged in alternating succession circumferentially, and usually also longitudinally with respect to the shaft. The hard material is united with a strong supporting back to enable the bearing to carry heavy loads. This load bearing structure is referred to as the grid or matrix. The areas of soft bearing material preferably are well bonded to the matrix and give the bearing desirable frictional properties as well as improved embeddability. Silver has desirable frictional and embeddability characteristics which make it an especially suitable matrix material for grid bearings. However, difficulties have been encountered with prior silver grid bearings because silver is corroded by lubricants which contain sulfur.

It is a principal object of this invention to provide a silver grid bearing which is highly resistant to corrosion caused by lubricating oils containing sulfur.

I have now discovered that a silver grid bearing which is highly resistant to corrosion caused by lubricants containing sulfur may be obtained by applying a coating of tin to a grid bearing surface comprising a multiplicity of alternating areas of silver and soft bearing material and thereafter diffusing the tin into the surface by heat treatment under conditions which do not adversely affect the soft bearing material. The resulting grid bearing is thus provided with a corrosion-resistant diffused tin-silver zone uniform throughout the exposed matrix surface.

In practice, the tin coating is applied, preferably by electrodeposition, over the composite grid bearing surface in a thickness which, in most cases, should not exceed about 0.0005". To provide proper corrosion protection, the tin coating generally should have a thickness of at least 0.00003". In most instances, optimum results are obtained by employing tin in a thickness within the range of about 0.00005" to 0.0002".

The diffusion heat-treatment generally is conducted for a period of time of at least one-half hour and generally not greater than twenty-four hours at a temperature not in excess of the temperature at which the soft bearing material filling the grid pits will flow or melt. At times, this temperature may be as high as about 550° F. I have found that, for practical purposes, the diffusion heat-treatment should be conducted at a temperature of at least 300° F. In many cases it is desirable to conduct the diffusion heat-treatment at a temperature within the range of about 325° to 400° F. for a time of about three to seven hours. At present, I prefer to conduct the diffusion heat-treatment at about 350° F. for approximately four hours.

In order to obtain superior performance with a silver grid bearing embodying the present invention it is desirable to have the alternating areas of soft bearing metal spaced from each other so that the number of grid pits or depressions per lineal inch is not less than about 15. While grid bearings having a very fine pattern will support heavy loads and afford longer life, in the case of bearings having more than about 100 grid pits per lineal inch manufacture is difficult because the pits or depressions are necessarily quite shallow and impose limitations on the tolerance of machine operations. I prefer to employ a silver grid bearing having between 19 and 65 grid pits per lineal inch. It will be understood, of course, that the grid pits may be arranged in any desired pattern. In one form the pits or depressions consist of fine grooves extending longitudinally of the bearing. In another embodiment the silver matrix may be provided with a multiplicity of projections, which are adapted to support a bearing load and are surrounded by soft bearing material in the completed bearing surface. A preferred form consists of a silver matrix having a surface which comprises a multiplicity of small spaced pits or depressions.

Various soft bearing materials may be employed to fill the grid pits, for example, lead-base alloys, such as alloys of lead containing small amounts of tin and/or antimony, tin-base alloys or other babbit type bearing materials. Excellent results are obtained in many instances by employing lead-tin alloys or lead-indium alloys. At times, it is desirable to cast a soft bearing material into the grid pits; a preferred alloy for such casting is an alloy which consists essentially of 94% lead, 3% tin and 3% antimony. At present, I prefer to electrodeposit an alloy of lead and tin; in particular, an alloy containing about 7% to 12% tin. In general, any soft bearing metal or alloy which may be electrodeposited, cast or otherwise applied to fill the grid pits may be used. Hence, the term "bearing material" as used herein is intended to include various conventional bearing metals and alloys.

The manufacture of corrosion-resistant silver grid bearings as described herein involves certain difficulties which I have succeeded in solving by employing the following method of manufacture:

I first electrodeposit on a backing or bearing support of a harder or stronger metal such as steel or the like, a coating of silver in any ordinary bearing thickness, for example, a thickness within the range of about 0.005" to 0.100". In many cases excellent results are obtained by employing a thickness of about 0.010" to 0.035" although at present, I prefer to employ a silver coating having a thickness of about 0.015". If desired, there may be a flash or strike electrodeposit coating, preferably of copper or nickel, on the backing or bearing support over which the silver is thereafter electrodeposited to the desired thickness. Such a flash or strike of copper or nickel aids in forming a strong bond between the silver and the backing member.

For a bearing employing a copper strike, a copper thickness of about 0.000020" is preferred, with the practicable range being about 0.0000050" to 0.000100" thickness. Using a nickel strike, a nickel thickness of about 0.000010" is presently preferred, with the practical range being from about .000005" to 0.000100" in thickness.

It is usually desirable to anneal the silver before machining. Where neither the nickel or copper strike is applied, the silver is normally annealed at a temperature of about 975° F. for one hour. In the case of a copper strike it is preferred to anneal the silver at about 1200° F. to prevent the formation of a relatively weak copper-silver eutectic alloy with a constant weakening of the bond. Temperatures much lower than 975° F. also may be employed. In fact, temperatures down to as low as room temperature may be used in certain cases depending on the characteristics of the silver bearing material which is deposited.

The silver bearing is then bored or machined to provide a uniform bearing wall thickness so that the completed bearing may have the desired undistorted pattern of grid pits. After the silver is bored, a multiplicity of grid pits or depressions are formed in its surface in any suitable manner, for example, as by passing the bearing through knurling rolls or other roller dies capable of forming the desired pits or depressions.

After the silver matrix has been gridded, the grid pits are filled with a soft bearing material. In most cases it is desirable to fill the grid pits by electrodepositing a layer of soft bearing material onto the matrix in a depth at least sufficient to completely fill the grid pits and, preferably, to a greater depth. The resulting surface is then machined to remove a portion of the soft bearing material and, in most instances, a portion of the matrix as well, to expose the desired composite surface comprising a multiplicity of alternating areas of soft bearing material and silver.

Over this composite grid surface is thereafter applied the aforementioned thin coating of tin. The resulting tin coated structure is subsequently heat treated to cause diffusion of the tin and silver to provide a bearing having a uniform diffusion zone of tin-silver which is highly resistant to corrosion caused by lubricants containing sulfur. Although the diffusion zone may be only slightly thicker than the tin coating applied, the bearing preferably should be heated in the above manner for a sufficient time to diffuse the tin to a sufficient depth to form a layer several times thicker than the original tin coating.

Referring now to the accompanying drawing in which the relative proportions are somewhat exaggerated for purposes of illustration:

Figure 1:
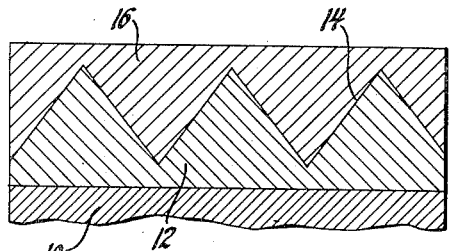
Figure 1 is an enlarged fragmentary sectional view of a gridded silver matrix on a strong backing and coated with a soft bearing material.
Figure 2:
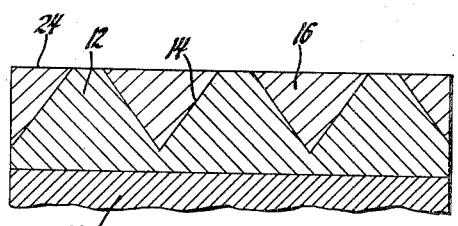
Figure 2 is a sectional view, similar to Figure 1, of a grid bearing with a composite grid surface exposed.
Figure 3:
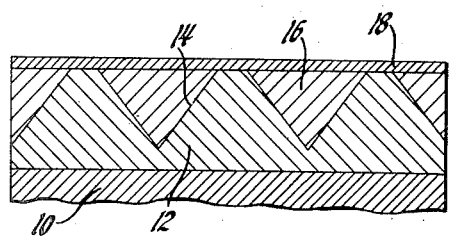
Figure 3 is a view analogous to Figure 2 showing a similar bearing having a thin layer of tin deposited thereon.
Figure 4:
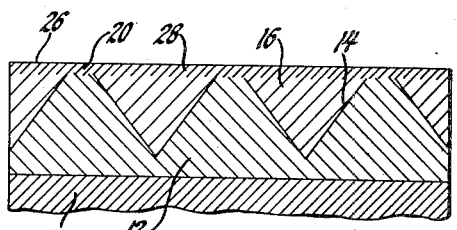
Figure 4 is a view similar to Figure 3 showing a completed grid bearing with tin diffused into the bearing surface.

Referring more particularly to the figures of the drawing:

There is shown at 10 a strong backing member of steel or the like. Bonded to the backing member is a silver matrix layer 12 having grid pits 14 formed in its surface. As shown in Figure 1, a soft bearing material 16 is applied over the matrix surface to fill the grid pits 14. The soft bearing material 16 is applied to the gridded matrix, by electrodeposition, casting, or other suitable means, in a thickness at least equal to, but preferably greater than, the depth of the grid pits. As a result, it is usually necessary to remove, by machining or the like, a portion of the soft bearing material 16 and, in most cases, a portion of the matrix layer 12 to expose a composite surface 24 as shown in Figure 2. Over the composite surface 24 subsequently is applied a thin coating 18 of tin to provide a structure as shown in Figure 3. In accordance with the present invention, the tin coated silver grid bearing is then subjected to a diffusion heat treatment to produce a grid bearing as shown in Figure 4 in which the wear surface 26 comprises a multiplicity of areas of diffused tin-silver 20 and soft bearing material 28.

Figure 5:
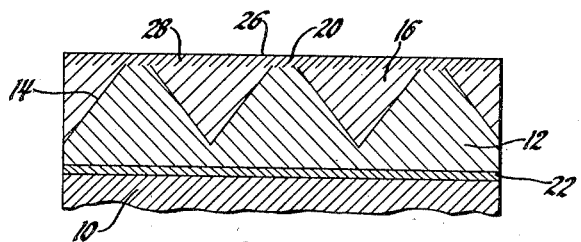
Figure 5 illustrates, in a view similar to Figure 4, another embodiment of the invention in which a bonding layer is shown interposed between the backing material and the silver grid.

Figure 5 illustrates a modification wherein the silver matrix layer 12 is bonded to a backing member 10 through a thin metallic layer 22. Such a bearing is manufactured in the same manner as the bearing illustrated in Figure 4 except that a thin metallic layer 22 is applied to the backing member 10 prior to deposition of the silver matrix layer 12.

The term "silver" as used herein is intended, of course, to include silver-base alloys containing small amounts of alloying constituents other than silver as well as commercially pure silver.

It is to be understood that, although the invention has been described with specific reference to particular embodiments thereof, it is not to be so limited since changes and alterations therein may be made which are within the full intended scope of this invention as defined by the appended claims.

It is claimed:

1. A method of forming a grid bearing which comprises the steps of depositing a coating of silver on a backing member, die forming a multiplicity of indentations in the surface of said silver coating, filling said indentations with a soft bearing material, removing a portion of said silver and soft bearing material, depositing a thin coating of tin over the resulting surface, and heat treating the resultant structure to cause diffusion of the tin and silver.

2. A method as in claim 1 in which a thin coating of a metal of the class of nickel and copper is interposed between the silver and the backing member.

3. The method of forming a grid bearing which comprises the steps of forming indentations in the surface of a silver matrix, electrodepositing a coating of a soft bearing material onto the surface of the matrix in a thickness greater than the depth of said indentations, removing a portion of said soft bearing material to expose a composite bearing surface which comprises a multiplicity of alternating areas of soft bearing material and silver, electrodepositing a thin coating of tin over said surface and diffusing the tin into the surface by heat-treatment at a temperature within the range of about 300° to 550° F.

4. The method as in claim 3 in which the silver is annealed before indentations are formed in its surface.

5. A method of forming a silver grid bearing which includes the steps of electrodepositing a coating of silver onto a strong backing member, forming a multiplicity of circumferentially and transversely spaced small grid pits in the surface of said silver coating, filling said grid pits with a soft bearing material to form a composite grid surface, removing a portion of said soft bearing material and the silver between said spaced grid pits, depositing a thin coating of tin over the resulting surface and diffusing the tin into said composite surface by heat-treatment at a temperature within the range of about 350° to 400° F. for a time within the range of about 4 to 7 hours.

6. The method as in claim 5 in which a metallic flash coating is deposited on the backing member before the silver coating is deposited.

7. A method of forming a grid bearing which comprises the steps of die forming, in a silver matrix, a multiplicity of projections adapted to support a bearing load, surrounding said projections with a lead-base bearing alloy to thereby provide a smooth composite surface, machining off a portion of said lead base alloy and said silver matrix, and thereafter diffusing tin into said surface.

8. A method of forming a corrosion-resistant grid bearing which comprises electrodepositing a flash coating of a metal selected from the class consisting of nickel and copper onto a steel backing member, electrodepositing a layer of silver onto said flash coating, annealing said silver layer, thereafter die forming a multiplicity of circumferentially and transversely spaced small grid pits in the surface of said silver layer, subsequently applying to the surface of said silver layer a soft layer of a lead-base alloy having a thickness greater than the depth of said grid pits, machining off a portion of said lead-base alloy layer and silver to expose a gridded surface which comprises a multiplicity of alternating areas of lead-base alloy and silver, thereafter electrodepositing a thin coating of tin over said gridded surface, and finally diffusing the tin into said gridded surface by heat treatment at a temperature within the range of approximately 300° F. to 550° F. for a period of three to seven hours to thereby form a multiplicity of spatially separated tin-silver diffusion zones each having a thickness several times greater than the original tin coating.

9. A method of forming a corrosion-resistant grid bearing which comprises electrodepositing approximately 0.000005 inch to 0.0001 inch of a metal selected from the class consisting of nickel and copper onto a steel backing member, electrodepositing a layer of silver having a thickness between approximately 0.005 inch and 0.1 inch onto said first coating, annealing said silver layer, thereafter die forming a multiplicity of circumferentially and transversely spaced small grid pits in the surface of said silver layer so as to provide about 19 to 65 grid pits per lineal inch, subsequently applying to the surface of said silver layer a soft layer of a lead base alloy having a thickness greater than the depth of said grid pits, machining off a portion of said lead base alloy layer and silver to expose a gridded surface which comprises a multiplicity of alternating areas of lead base alloy and silver, thereafter electrodepositing a coating of tin having a thickness of about 0.00003 inch to 0.0005 inch over said gridded surface, and finally diffusing the tin into said gridded surface by heat treatment at a temperature of approximately 300° F. to 550° F. for three to seven hours to thereby form a multiplicity of spatially separated tin-silver diffusion zones each having a thickness several times greater than the original tin coating.

References Cited in the file of this patent

UNITED STATES PATENTS

| | | |
|---|---|---|
| 2,187,755 | Ryder | Jan. 23, 1940 |
| 2,241,789 | Queneau et al. | May 13, 1941 |
| 2,431,430 | Shaw | Nov. 25, 1947 |
| 2,621,988 | Donley | Dec. 16, 1952 |

FOREIGN PATENTS

| | | |
|---|---|---|
| 536,414 | Great Britain | May 14, 1941 |
| 683,404 | Great Britain | Nov. 26, 1952 |